June 2, 1970 R. E. HAIGHT ET AL 3,515,246
FINAL DRIVE LUBRICATING DEVICE
Filed Sept. 25, 1968
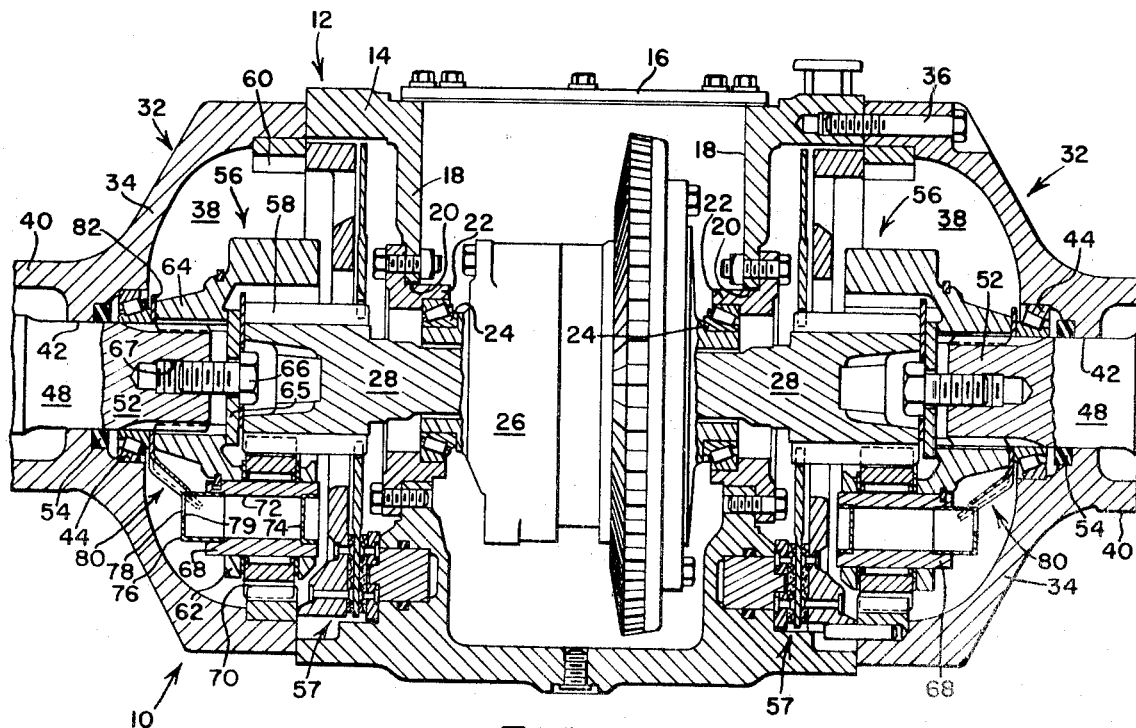
FIG. 1
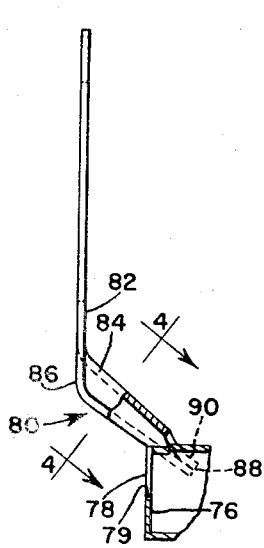
FIG. 2
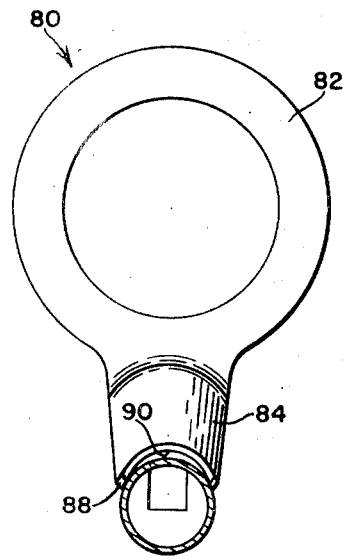
FIG. 3
FIG. 4
INVENTORS
R. E. HAIGHT
T. M. SULLIVAN

United States Patent Office 3,515,246
Patented June 2, 1970

---

3,515,246
FINAL DRIVE LUBRICATING DEVICE
Robert Eugene Haight, Waterloo, and Thomas Milo Sullivan, Cedar Falls, Iowa, assignors to Deere & Company, Moline, Ill., a corporation of Delaware
Filed Sept. 25, 1968, Ser. No. 762,475
Int. Cl. F01m 9/06
U.S. Cl. 184—11     6 Claims

ABSTRACT OF THE DISCLOSURE

A drive axle assembly includes a pair of axle housings projecting from opposite sides of a central differential housing, and a pair of drive axles have their inner ends journaled in bearings mounted in the axle housings. The axles are driven through planetary final drives, having oil reservoirs in the planetary pinion shafts, which are filled with oil as they dip below the oil level in the housing. A trough conducts the oil from each reservoir to the respective axle bearings when the reservoir moves above the oil level and the axis of the drive axles.

BACKGROUND OF THE INVENTION

This invention relates to a vehicle drive axle structure and more particularly to improved means for lubricating the inner axle bearings in such a structure.

A conventional vehicle drive axle structure includes a central differential gear, which drives a pair of oppositely-extending drive axles, the differential gear and the inner ends of the drive axles being mounted in a closed housing, which is partly filled with oil to provide lubrication for the differential gearing. In most slow-moving vehicles, such as agricultural and industrial tractors, additional reduction gearing is interposed between the differential gearing and the axles, the reduction gearing also being mounted within the housing and lubricated by the oil therein. It is also known to utilize planetary-type final drives for the reduction gearing and further to provide disk-type brakes in the housing for individually braking the opposite drive axles.

With all of the above components mounted on the housing, a relatively wide housing is required, and there is a substantial distance between the opposite inner axle bearings. Normally, the housing is filled with fluid to at least the axis of the drive axles to provide the necessary lubrication for the differential and fiinal gearing, as well as the inner axle bearings. However, in off-the-road vehicles, such as agricultural tractors and particularly certain types of industrial tractors, the vehicles are frequently operated on substantial lateral slopes, and since the housing is relatively wide, the oil tends to drain to the downhill side of the housing, leaving the inner axle bearing on the uphill side of the housing above the level of the lubricating oil. Of course, continued operation of the vehicle in this condition will cause premature failure of the unlubricated bearing, resulting in an expensive and time-consuming teardown of the axle structure. This problem is particularly acute in off-the-road vehicles having drive axles which oscillate about a fore-and-aft axis, since the drive axle in such a vehicle might be disposed at a steeper slope than the remainder of the tractor.

SUMMARY OF THE INVENTION

According to the present invention, means are provided for supplying lubricating oil to the inner axle bearings when the axle structure is transversely inclined to such a degree that the bearing is above the level of the lubricating oil in the axle structure housing. More specifically, a rotating reservoir is provided on one of the rotating drive elements, whereby the reservoir dips below the oil level during the lower portion of its rotation and receives oil thereby and supplies oil to the elevated bearing during the upper portion of its rotation when it is above the level of the bearing. Another feature of the invention resides in the provision of means for conducting the oil from the reservoir to the bearing when the reservoir is elevated relative to the bearing. Still another feature of the invention resides in the provision of such a lubricating device that is compact and requires no additional space within the housing structure, and which is also simple and inexpensive to manufacture and install.

BRIEF DESCRIPTION OF THE DRAWINGS

FIG. 1 is a fragmentary vertical, axial section through the central portion of the drive axle structure embodying the invention, the opposite ends of the drive axle structure being omitted, and the differential gearing being shown in full.

FIG. 2 is an enlarged fragmentary view of the lubricating device, with portions of the device being shown in an axial section.

FIG. 3 is an end or axially directed view of the conduit portion of the lubricating device.

FIG. 4 is a section view of the conduit portion of the device as viewed generally along the line 4—4 of FIG. 2.

DESCRIPTION OF THE PREFERRED EMBODIMENT

The invention is embodied in a drive axle structure indicated in its entirety by the numeral 10, only a central portion of the drive axle structure being shown in the drawings since the invention is associated with the central portion of the structure, the opposite ends of the drive axle structure being of conventional construction. The drive axle structure 10 includes a housing 12, which typically includes an enlarged, hollow differential housing portion 14 having its top closed by a flat top plate 16. The differential housing portion 14 includes opposite, upright, identical side walls 18 having transversely aligned bores 20 into which a pair of identical bearing retainers 22 are respectively bolted, the bearing retainers supporting coaxial differential bearings 24 on opposite sides of the housing. Differential gearing 26 of conventional construction is journaled in the opposite bearings 24 within the differential housing portion 14 and includes a pair of opposite differential output shafts 28, which project in opposite directions from the differential 26 and coaxially extend through the bearing retainers 22.

A pair of axle housings 32 of substantially identical construction extend from opposite sides of the differential housing portion 14, only the inner portions of the axle housings being shown in the drawings since they are of conventional construction. Each axle housing has an enlarged hollow inner end 34 secured to the side of the differential housing portion 14 by a number of bolts 36, only one bolt 36 attaching the right-hand axle housing 32 to the right side of the differential housing portion being shown in the drawings. The hollow inner ends of the axle housings from substantially closed cavities 38 on opposite sides of the differential housing cavity, the opposite cavities 38 communicating with the differential housing through the bearings 24.

Each axle housing includes an elongated hollow outer portion 40, extending outwardly from the enlarged inner ends 34, and an axial bore 42 connects the cavity 38 with the interior of the outer portion 40. Mounted in the outer cavity wall of each axle housing adjacent the bore 42 is an inner axle bearing 44, the bearings 44 in the opposite axle housings being transversely aligned and coaxial with the differential output shafts 28.

A pair of drive axles 48 are rotatably mounted in the axle housing 32, the inner ends 52 of the axles 48 having an externally splined surface projecting into the cavities 38. The inner ends of the axles are journaled in the inner axle bearings 44, while the outer ends of the axles are journaled in the outer ends of the axle housings by suitable bearings (not shown). An oil seal 54 between each axle housing and its respective axle adjacent to and outwardly of the bearing 44 seals each cavity 38, so that the two cavities 38 and the hollow differential housing connected thereto form a substantially fluid-tight container.

The inner end 52 of each axle is coaxially connected to its respective differential output shaft 28 by means of a planetary final drive, indicated in its entirety by the numeral 56, the respective planetary drives being disposed within the respective cavities 38. Also disposed within each cavity 38 adjacent to the planetary gear train is a disk-type brakes 57, operative to lock the respective differential output shaft 28 to the housing, the two brakes 57 being conventionally actuatable separately or in unison for braking either or both of the drive wheels.

Each planetary gear train includes a sun gear element 58, which is formed by an external spline on the end of the differential output shaft 28, a ring gear element 60 attached to the interior wall of the axle housing cavity 38, and a carrier element 62 coaxially attached to the inner end of the axle. The carrier element includes an internally splined hub portion 64 splined to the externally splined inner end 52 of the axle and retained thereon by an annular retainer 65 engaging the carrier hub 64 and releasably connected to the inner end of the axle by a bolt 66 threaded into a threaded bore 67 in the end of the axle, so that tightening of the bolt 66 forces the carrier hub 64 outwardly against the bearing 44. The carrier rotatably supports a tubular pinion shaft 68 on which a planetary pinion 70 is rotatably mounted, the axis of the pinion 70 being parallel to the axis of the planetary drive. While only a single pinion shaft 68 and pinion 70 is shown in each planetary drive 56, preferably three planetary pinions are provided, to provide a balanced planetary drive as is conventional.

The pinion shaft 68 has an axial bore 72 extending its entire length, and the inner end of the bore 72 is closed by a closure member 74, while the opposite or outer end of the bore is closed by a closure member 76 having an aperture or opening 78 in its outer radial face. The outer edge 79 of the opening 78 is approximately at the axis of the shaft 68, so that, when the shaft is in a lowermost position as shown in the drawings, the shaft bore 72 and the closure members 74 and 76 form a reservoir which is capable of retaining fluid up to the level of the edge 79.

Mounted on the inner end 52 of each axle for rotation therewith is a conduit element indicated in its entirety by the numeral 80. Each conduit element includes a flat annular part 82, coaxially mounted on the axle end 52 and clamped between the bearing 44 and the outer end of the carrier hub 64, and an inclined trough member 84, extending between the periphery of the annular part 82 and the opening 78 in the reservoir formed by the bore 72 and the closure members 74 and 76. As best seen in FIG. 4, the trough member 84 has an arcuate cross section facing outwardly and has a discharge end 86 adjacent to the bearing 44 and an intake end 88 in a fluid-receiving relationship with the opening 78, the intake end having a curved recess 90 adapted to fit around the outer periphery of the closure member 76. The intake end 88 is disposed a greater radial distance from the axis of the axle than the discharge end 86 and is also axially offset a greater distance from the bearing 44 than the discharge end, the trough member being inclined at approximately a 35° angle relative to the axis of the axle.

Since only a single hollow pinion shaft 68 is illustrated at each planetary gear train, each conduit 80 only includes one trough member for conducting the fluid from the shaft interior to the bearing. Of course, if additional planetary pinion gears 70 are provided, their pinion shafts 68 can also be made to form a reservoir in the same manner as the illustrated pinion shaft, and additional trough members 84 can be attached to the annular part 82 in the same manner as the illustrated trough member 84.

In operation, the housing is filled with lubricating oil to approximately its center line, so that the inner axle bearings 44 are at least partly running in oil when the axle structure is in a substantially level condition. When the axle structure is tilted to a substantial degree so that the oil level is below most or all of the inner axle bearing on the uphill side of the axle structure, lubricating oil is supplied to the uphill bearing through the uphill conduit 80 from the reservoir formed in the pinion shaft 68 in the following manner. When the pinion shaft 68 is in its lowermost position, as shown in FIG. 1, the outer or lower edge 79 of the opening 76 should be below the oil level in the housing even when the vehicle is on a substantial lateral slope, since it would be unsafe to operate the vehicle on an incline where the oil level would remain below the opening 78. When any portion of the opening 78 is below the oil level, oil flows into the reservoir formed by the bore 72 in the pinion shaft and the closure members 74 and 76. As the pinion shaft 68 rotates with the carrier 62, it rises above the oil level, and during the upper portion of the pinion shaft's rotation with the carrier, oil flows from the reservoir through the opening 78. Since the conduit 80 also rotates with the carrier element, the trough member 84 maintains the same relationship with the pinion shaft, and receives the oil flowing through the opening 78 and conducts it to its discharge end 86 from which it flows directly into the upper portion of the bearing 44 to provide the necessary lubrication. Since the bearing lubricating means are provided at both sides of the axle housing adjacent to both bearings 44, the bearings 44 receive proper lubrication regardless of which bearing is on the uphill side.

We claim:

1. In a drive axle structure including a housing means adapted to contain oil at a predetermined level, a pair of opposite coaxial drive axles, and a pair of bearings mounted in the opposite sides of the housing means and respectively journaling the opposite drive axles, and a drive means disposed within the housing means and operative to drive the respective drive axles, the drive means including a pair of rotatable elements rotatable with the respective drive axles, the improvement comprising: an oil reservoir means mounted on at least one of the rotatable elements and offset from the axis of rotation of said element, the reservoir means moving below the predetermined oil level during a lower portion of its rotation with the rotatable element to receive a quantity of oil and elevating the quantity of oil above the axis of the rotatable element during an upper portion of its rotation; and conduit means associated with each reservoir means and operative to conduct oil from the reservoir to one of said bearings during the upper portion of the reservoir rotation.

2. The invention defined in claim 1 wherein at least two reservoir means are provided and are mounted on the respective rotatable elements, and a pair of conduit means respectively connect the reservoir means to the opposite bearings.

3. The invention defined in claim 2 wherein the drive means includes a pair of planetary final drives, each drive including first and second coaxial gear elements, a carrier element, and planetary pinion means rotatably carried by the carrier element and constantly meshing with the first and second elements, the reservoir means being mounted on and rotatable with the respective carrier elements.

4. The invention defined in claim 3 wherein each reservoir means includes a hollow tubular member carried by the carrier element and rotatably supporting a pinion means, a first closure member mounted in and closing one end of the tubular member, and a second closure member having an opening and mounted in and partly enclosing the other end of the tubular member.

5. The invention defined in claim 4 wherein the conduit means includes a trough member rotatable with the rotatable element and having a first end adjacent the bearing and a second end operatively associated with the closure member opening to receive fluid therefrom, the trough member being open upwardly and inclined downwardly and outwardly from the second end toward the first end during the upper portion of its rotation and operative to conduct fluid from the reservoir means to the bearing.

6. In a drive axle structure having a housing means adapted to contain lubricating oil at a predetermined level, a pair of opposite coaxial drive axles, and a pair of bearings mounted in the housing means and respectively journaling the inner ends of the drive axles, the improvement comprising: a pair of conduit means respectively mounted adjacent to the inner ends of the respective drive axles for rotation therewith, each conduit means including an annular portion coaxially mounted the respective axle adjacent to and inwardly of the respective bearing and a trough member connected to and extending outwardly from the annular portion and inclined radially outwardly and axially inwardly from the bearing, the trough member being open outwardly and toward the bearing and being adapted to conduct oil to the bearing during the upper portion of its rotation.

References Cited
UNITED STATES PATENTS

| | | | |
|---|---|---|---|
| 1,741,501 | 12/1929 | Crawford | 184—11 XR |
| 1,749,247 | 3/1930 | Graham | 184—11 |
| 2,492,267 | 12/1949 | Burrows et al. | 184—11 |
| 2,618,359 | 11/1952 | Alden | 184—11 |
| 2,645,305 | 7/1953 | Roos | 184—11 |
| 3,138,222 | 6/1964 | Dames et al. | 184—11 |

MANUEL A. ANTONAKAS, Primary Examiner

U.S. Cl. X.R.

74—467